United States Patent [19]

Ward et al.

[11] Patent Number: 4,953,079
[45] Date of Patent: Aug. 28, 1990

[54] CACHE MEMORY ADDRESS MODIFIER FOR DYNAMIC ALTERATION OF CACHE BLOCK FETCH SEQUENCE

[75] Inventors: William P. Ward, Poway, Calif.; Douglas R. Beard, Eau Claire, Wis.

[73] Assignee: Gould Inc., Rolling Meadows, Ill.

[21] Appl. No.: 173,406

[22] Filed: Mar. 24, 1988

[51] Int. Cl.[5] .................... G06F 12/06; G06F 13/00
[52] U.S. Cl. .................... 364/200; 364/243.4; 364/243.41; 364/246; 364/246.1; 364/246.3; 364/246.4; 364/254; 364/254.3; 364/254.4
[58] Field of Search ... 364/200 MS File, 900 MS File; 371/13

[56] References Cited

U.S. PATENT DOCUMENTS

| | | | |
|---|---|---|---|
| 3,449,724 | 6/1969 | Boland et al. | 364/200 |
| 3,806,888 | 4/1974 | Brickman et al. | 364/200 |
| 4,157,587 | 6/1979 | Joyce et al. | 364/200 |
| 4,317,168 | 2/1982 | Messina et al. | 364/200 |
| 4,445,191 | 4/1984 | York | 364/900 |
| 4,802,125 | 1/1989 | Yamada | 364/200 |

Primary Examiner—Gareth D. Shaw
Assistant Examiner—Paul Kulik
Attorney, Agent, or Firm—Fleit, Jacobson, Cohn, Price, Holman & Stern

[57] ABSTRACT

A cache memory includes an address modification circuit for operation during a cache block fetch sequence. The address modification circuit is connected to a polling circuit which receives a first word address from other portions of the cache memory connected to an instruction unit. The polling circuit tests whether a memory module storing the first word is free to make a data return transfer to the cache memory. When the memory module indicates that it is inhibited from making the data return to the cache memory, the address modification circuit selects in order of priority the next word in a cache block to be fetched and polls a memory module storing the next word. Word address selection and polling continues until a free memory module responds or until all words in the cache block have been fetched from main memory.

6 Claims, 12 Drawing Sheets

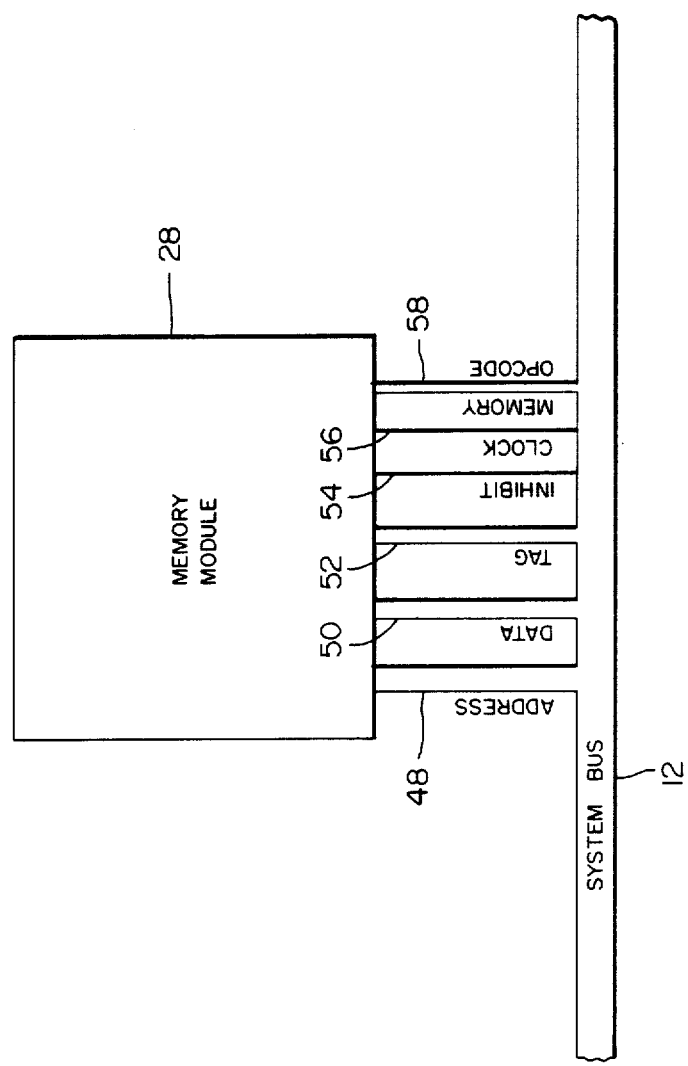

FIG. 3B

CACHE MEMORY ADDRESS MODIFIER FOR DYNAMIC ALTERATION OF CACHE BLOCK FETCH SEQUENCE

CROSS REFERENCES TO RELATED APPLICATIONS

This application is related to applications for:

"System For Monitoring and Capturing Bus Data in a Computer" to Smith et al., application Ser. No. 173,222, filed on the same day as this application and assigned to the assignee of this application;

"Bus Structure for Overlapped Data Transfer" to Thomas et al., application Ser. No. 173,212, on the same day as this application and assigned to the assignee of this application;

"Cache Memory with Interleaved Storage" to Ward et al., application Ser. No. 173,405, filed on the same day as this application and assigned to the assignee of this application; and "Advance Polling Bus Arbiter for Use In Multiple Bus System" to Ward, application Ser. No. 173,211, filed on the same day as this application and assigned to the assignee of this application.

BACKGROUND OF THE INVENTION

The invention relates to an addressing system for efficiently fetching a block of information into cache memory. More particularly, the invention relates to a memory address modification system for dynamically testing for local inhibit signals from portions of an interleaved memory and altering the sequence in which words of a cache block are fetched in response to the inhibit signals.

Designers of digital computers have recognized that the central processing unit of a digital computer in most instances can process information at a much higher rate than the information can be transferred to and from main memory. As a result, it is well known to those skilled in the art to employ a high speed buffer or cache memory adjacent the central processing unit to speed up the transfer of information to and from the processing unit during execution.

Typically, the high speed buffer or cache memory is relatively small and stores segments or blocks of information which are currently being used by the processor unit. The processor unit fetches words used as instructions or operands from the cache memory. Since the cache memory is small, at times the processor unit may attempt a fetch and receive a cache miss signal indicating that the cache does not contain the information to be fetched by the processor unit. In other words, the cache indicates that there is no cache hit for the fetch operation. At that point, the cache memory initiates a fetch operation to retrieve a block of information containing the missing word from main memory.

In some high performance computer systems, main memory is interleaved and spatially distributed across a system bus. In such a conventional system when a cache miss is indicated, the cache memory will initiate memory read operations for the missing block. One scheme which is commonly followed would require that the lowest order word in the block is fetched first followed by the next lowest and so on until all words in a particular block have been transferred into the cache memory from the main memory. In the event that one of the words to be fetched is unavailable, in other words, the portion of the main memory in which it is stored is temporarily inhibited, prior art cache memories typically wait until the inhibit is cleared, also causing the processor unit to wait. As a result, the processor unit functions at the same speed as a relatively slow speed portion of the interleaved memory. This can constitute a significant performance disadvantage.

What is needed then, is a system for improving the efficiency of memory read operations by a cache memory in order to maximize the efficiency of the attached processor unit.

SUMMARY OF THE INVENTION

A cache memory includes a dynamic address modification circuit for enhancing the efficiency of a cache block fetch sequence. The cache memory includes means for generating a word fetch address, a portion of which is fed to a control of a multiplexer. A plurality of input gates is connected to the multiplexer. Each of the input gates receives a signal from a memory module connected via a system bus to the cache memory indicative of whether the memory module is in a free or an inhibited state. A word fetch address is received by the multiplexer and causes the multiplexer to select one of the inhibit signal input gates. When the selected input gate produces a signal indicative of an inhibit condition for that module, an address modification signal is supplied to a second multiplexer connected to a priority encoder. The priority encoder generates an output signal indicative of the highest priority memory module which is not inhibited and which is currently storing an unfetched word. The priority encoder then generates a 3-bit address indicative of an available word to be recovered from the memory module thereby allowing words in a storage block to be retrieved from the memory module as the memory modules in a system become available.

It is a principal object of the present invention to provide an address modification circuit for operation during a cache block fetch sequence to reduce the number of cycles required to retrieve a cache block from main memory.

Other objects and uses of the present invention will become obvious to one skilled in the art upon a perusal of the following specification and claims in light of the accompanying drawings.

BRIEF DESCRIPTION OF THE DRAWINGS

FIG. 2 is a logic diagram of a portion of the cache memory of FIG. 1 having a dynamic address modification circuit embodying the present invention;

DESCRIPTION OF THE PREFERRED EMBODIMENT

Figure 1:
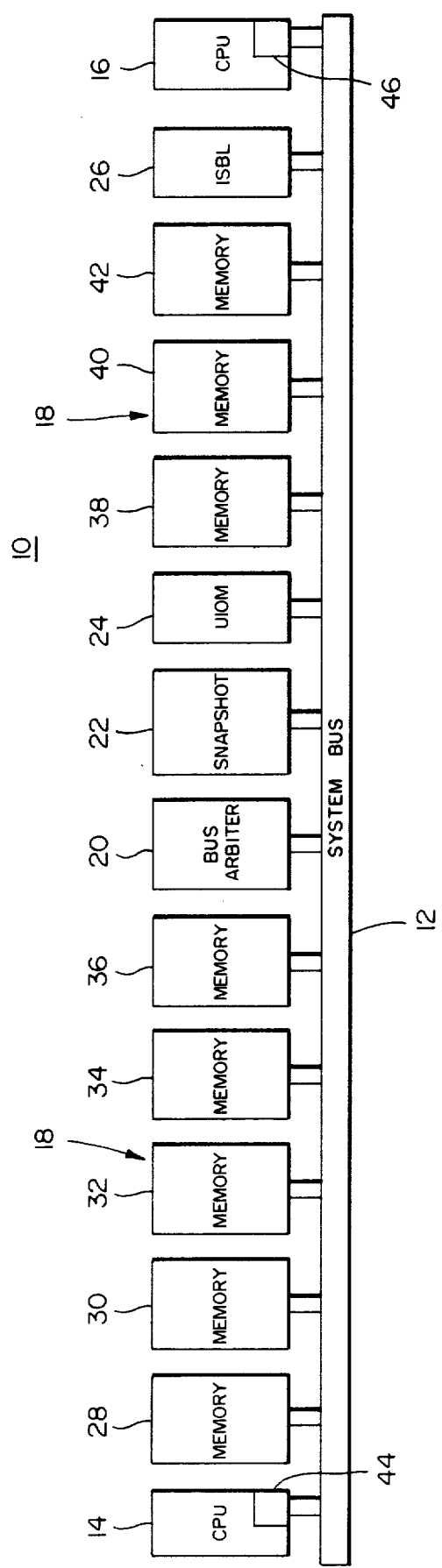
FIG. 1 is a block diagram of a twin central processor unit digital computer having a cache memory embodying the present invention connected to one of the central processing units and an interleaved distributed memory.

Referring now to the drawings and especially to FIG. 1, a digital computer embodying the present invention is shown therein and is generally identified by the numeral 10. The digital computer 10 includes a system bus 12 to which is connected a first central processing unit 14 and a second central processing unit 16. A main memory 18 is also connected to the system bus 12 as is a bus arbiter 20, a snapshot or system bus error detection unit 22, a universal input/output microengine 24 and an intersystem bus link 26.

The main memory 18 comprises a plurality of interleaved memory modules including a memory module 28 connected to the system bus 12, a memory module 30 connected to the system bus 12, a memory module 32 connected to the system bus 12, a memory module 34 connected to the system bus 12, a memory module 36 connected to the system bus 12, a memory module 38 connected to the system bus 12, a memory module 40 connected to the system bus 12 and a memory module 42 connected to the system bus 12.

The central processing unit 14 includes a cache memory 44. The central processing unit 16 includes a cache memory 46. The cache memories 44 and 46 are each organized to store blocks of information containing eight 32-bit words. Each of the eight 32-bit words is uniquely identified by a 32-bit address of which bits 26 through 28 comprise a word address. The words in a contiguous cache block are addressed by the bits 26–28.

As may best be seen in FIG. 2 the memory module 28 is connected to the system bus 12 by a plurality of subbuses including an address bus 48 which carries a 32-bit memory select address. A data bus 50 carries two memory words at a time each of 32-bits and associated parity bits. A tag bus 52 carries identifier information to coordinate data returns from the memory module 28 with fetch operations. An inhibit line 54 is asserted by the memory module 28 when its buffers are full or when for some other reason it is unable to act upon a request received from the system bus 12. A clock line 56 carries a timing signal to the memory module 28 from the system bus 12. A memory opcode bus 58 carries a parallel multi-bit signal indicative of an operation to be performed by the memory module 28, e.g. memory read, data transfer, etc.

Figure 3A:
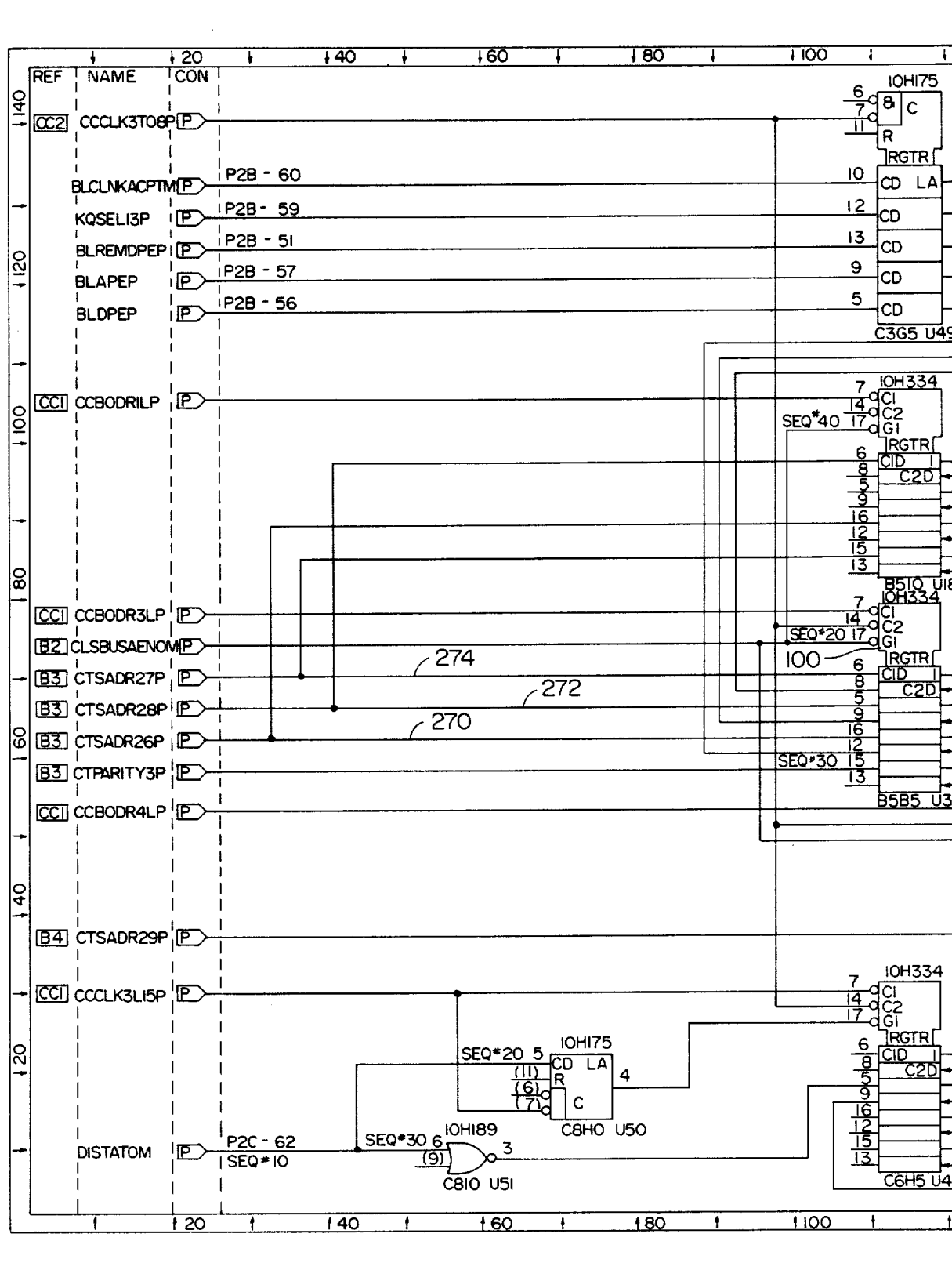
FIG. 3 is a logic diagram of a portion of the cache memory of FIG. 1.
Figure 3B:
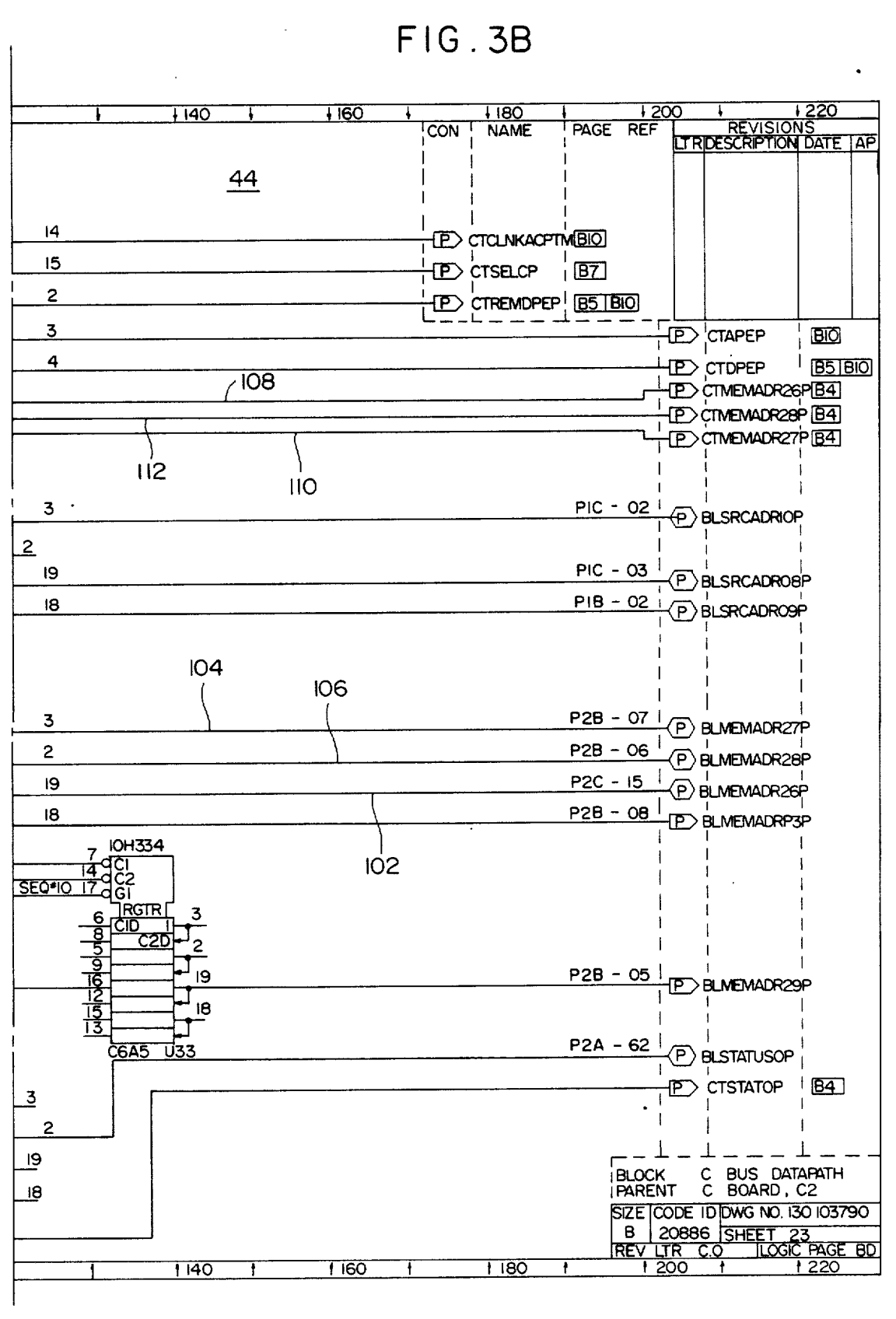

Referring now to FIG. 3, a portion of the memory addressing circuitry of the cache memory 44, is shown therein. An address register 100 is connected to a portion of the address bus 48. More specifically, a lead 102 carries bit 26 of the memory address, a lead 104 carries bit 27 of the address and a lead 106 carries bit 28 of the memory address. Bits 26 through 28 identify a word within an eight word contiguous block to be fetched from the main memory which is connected to the lines 102, 104 and 106. The address bits 26 through 28 are then fed through the register 100 to a CTMEMADR26P lead 108 which carries bit 26, a CTMEMADR27P lead 110 which carries bit 27 and a CTMEMADR28P lead 112 which carries bit 28.

Figure 5A:
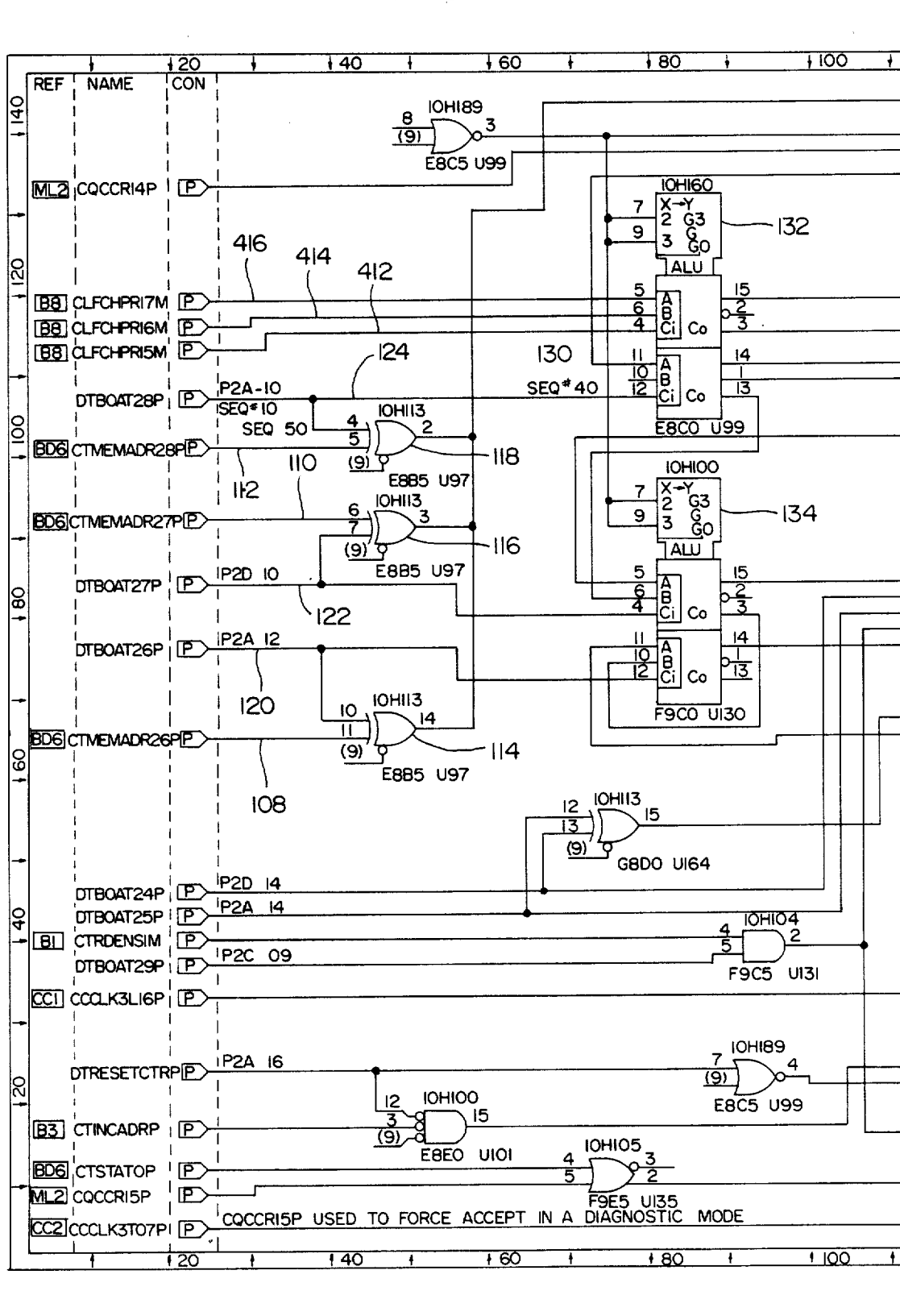
FIG. 5 is a logic diagram of a portion of the cache memory of FIG. 1.
Figure 5B:
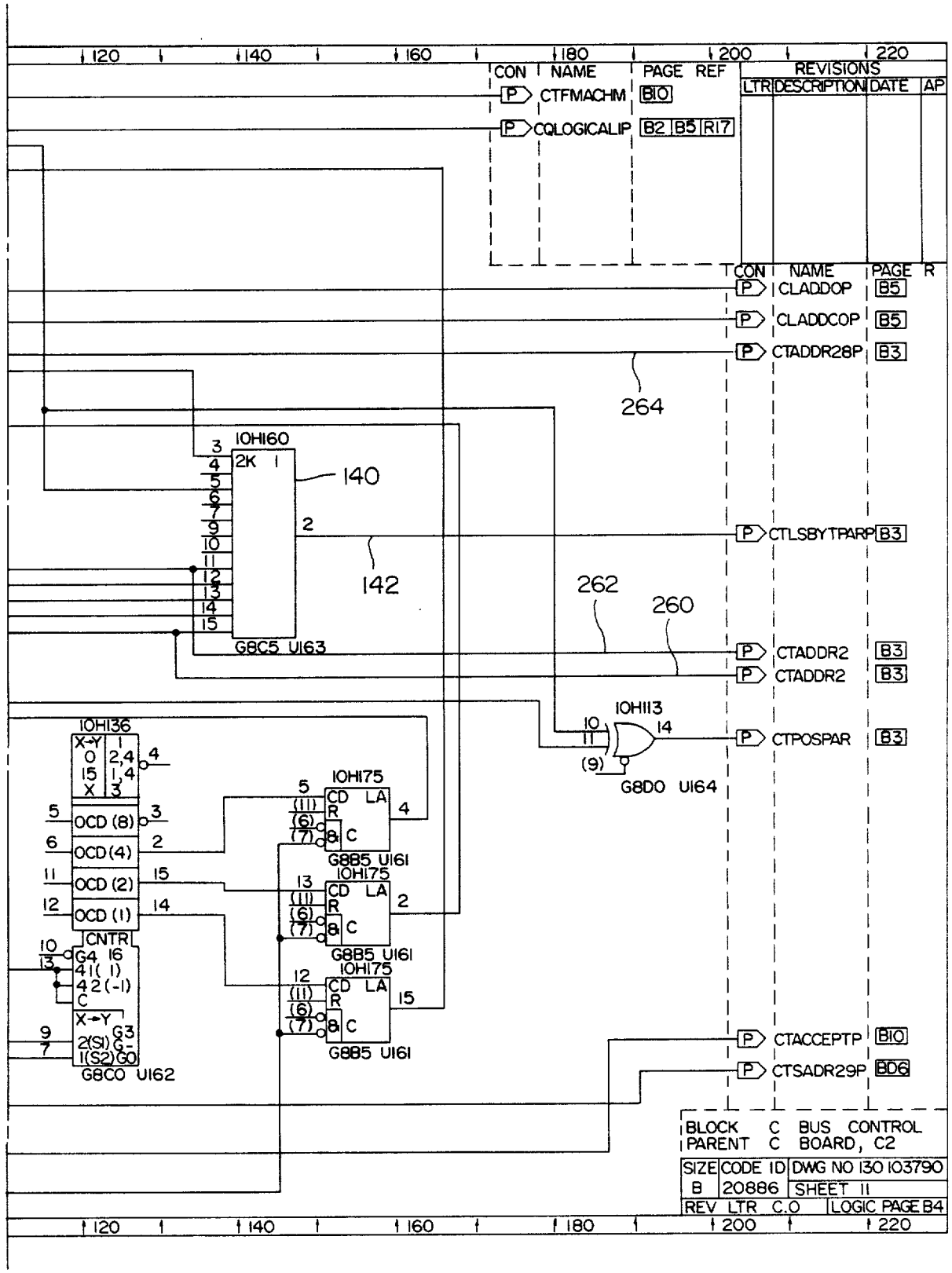
Figure 6A:
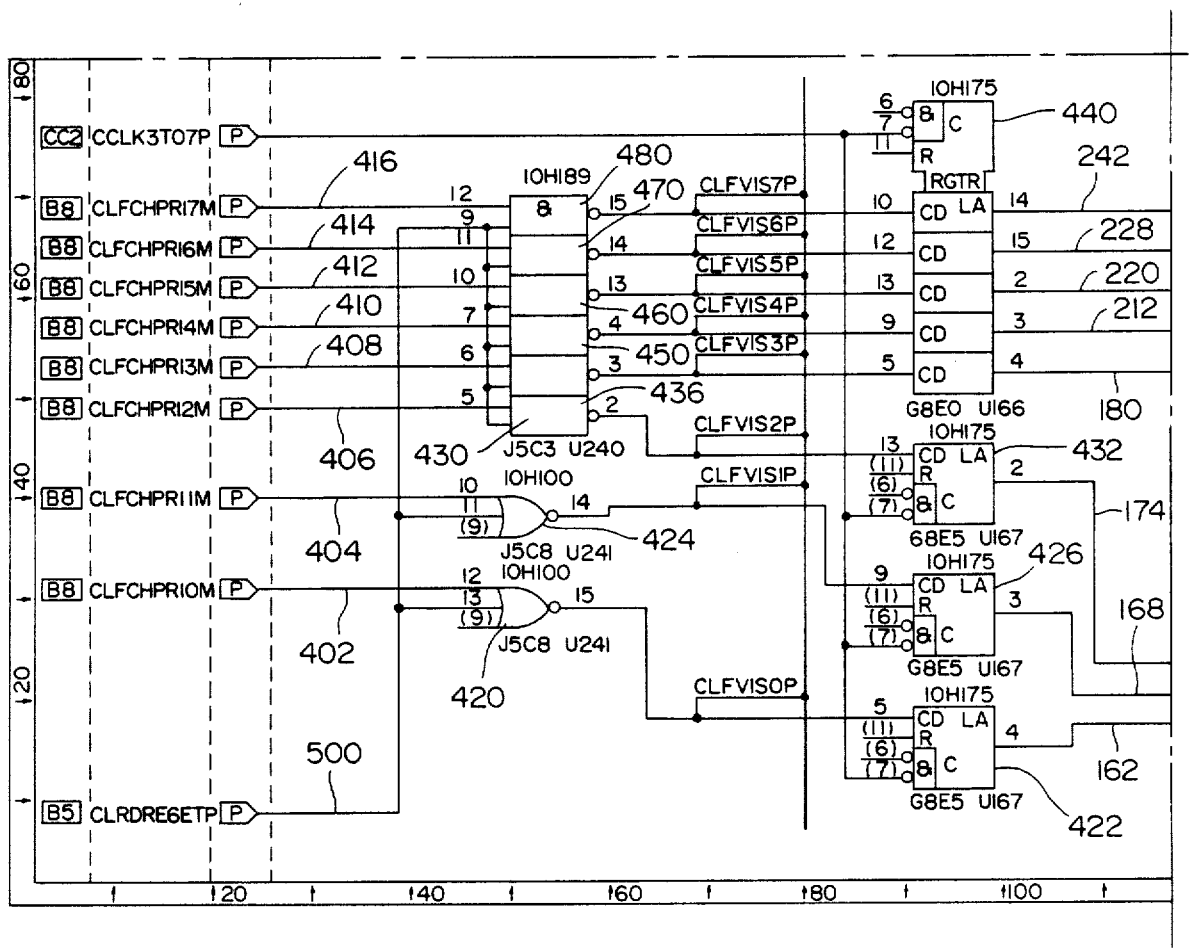
FIG. 6 is a logic diagram of a portion of the cache memory of FIG. 1.
Figure 6B:
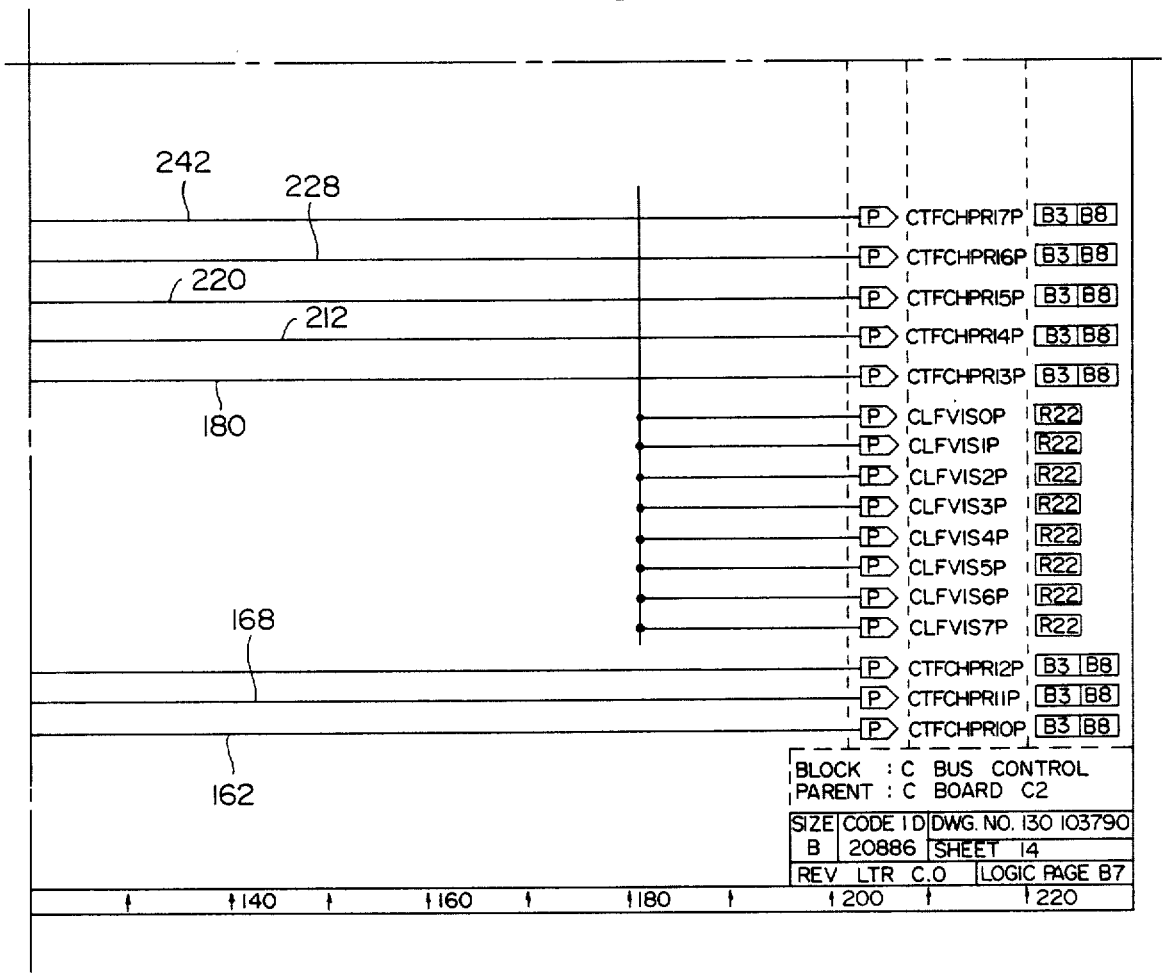

Referring now to FIG. 5, an exclusive OR gate 114 is connected to the lead 108. An exclusive OR gate 116 is connected to the lead 110. An exclusive OR gate 118 is connected to the lead 112. A portion of an internal cache bus which carries a cache word select address has a lead 120 to carry bit 26 of the word address, a lead 122 to carry bit 27 of the word address and a lead 124 to carry bit 28 of the word address. The leads 108 and 120 are connected to the exclusive OR gate 114. The leads 122 and 110 are connected to the exclusive OR gate 116. The leads 112 and 124 are connected to the exclusive OR gate 118. The outputs of the exclusive OR gates 114 through 118 are connected to an OR gate lead 130 which provides an output indication as to whether there is a match between the memory address and the address carried by the cache bus.

An arithmetic logic unit 132 and an arithmetic logic unit 134, in the current embodiment both comprising a 10H180 emitter coupled logic adder/subtracter is connected to add the 3-bit signal from the leads 120, 122 and 124 to produce a signal indicative of an off-bus transfer in the event the intersystem bus link 26 is to be utilized. However, in the event that the transfer is to be made from the memory 18, a 0 is added to the 3-bit signal on the leads 120, 122 and 124 and the output is fed to a 12-bit parity generator/checker, in this instance, a 10H160 emitter coupled logic 12-bit parity generator/checker 140 which outputs a parity signal on a lead 142.

Figure 4A:
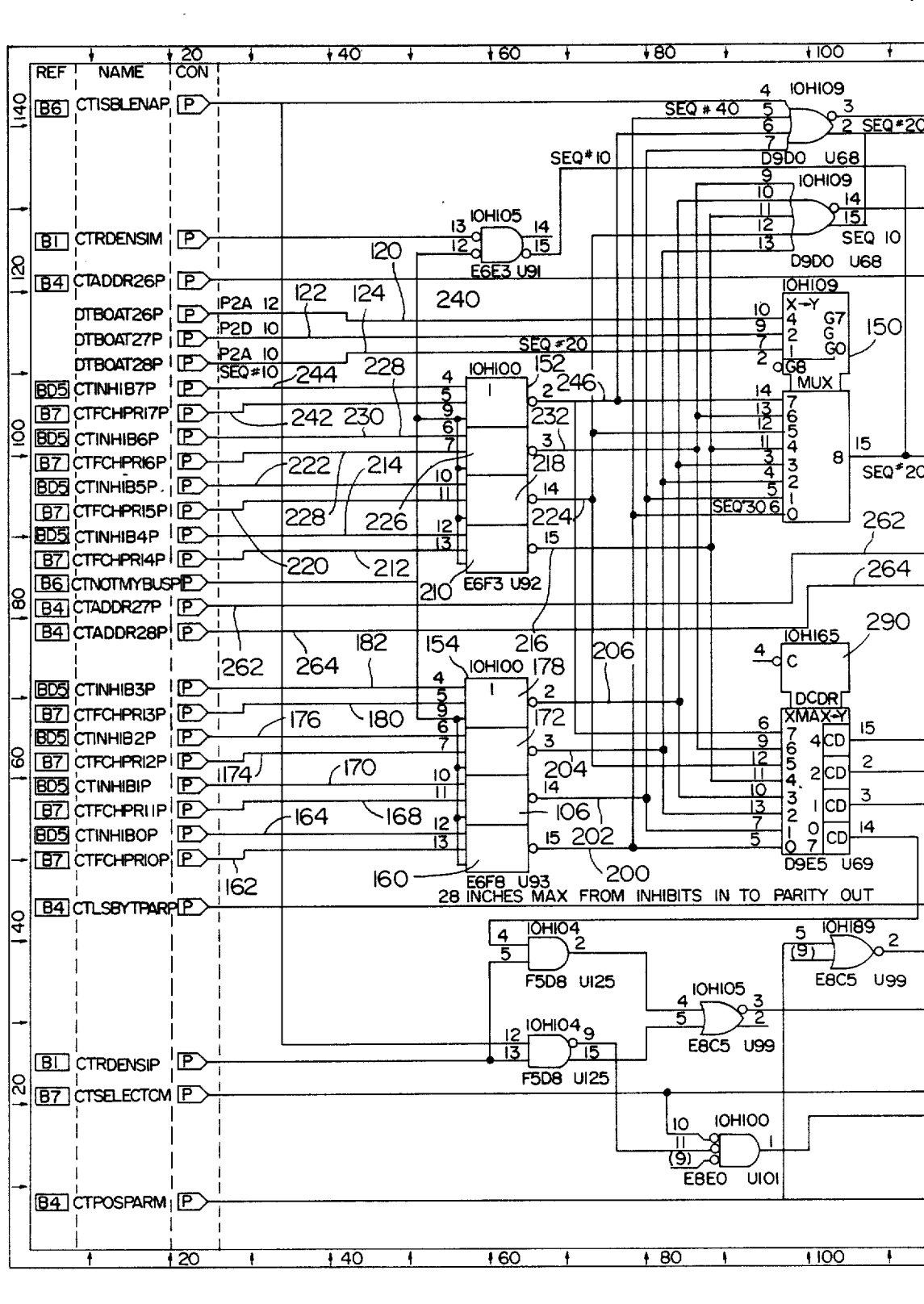
FIG. 4 is a logic diagram of a portion of the cache memory of FIG. 1.
Figure 4B:
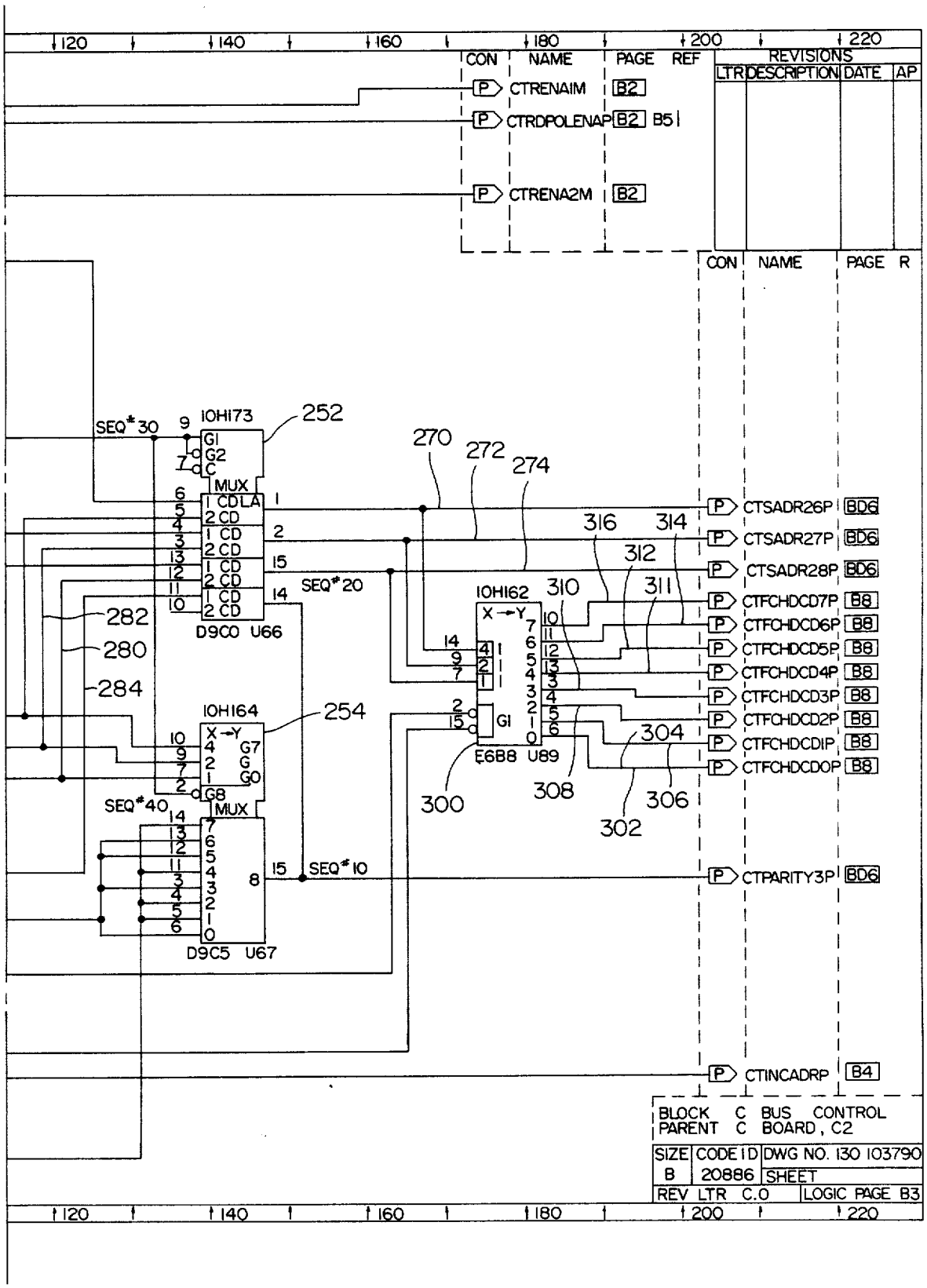

Referring now to FIG. 4, the 3-bit internal word address signal indicative of the word in a particular cache block to be fetched is fed via leads 120 through 124 to a multiplexer 150, and in particular, to the multiplexer control terminals of the multiplexer 150. The multiplexer 150 is a 10H164 emitter coupled logic 8 to 1 multiplexer and is connected to a first NOR gate stack 152 and a second NOR gate stack 154. The NOR gate stacks 152 and 154 each comprise four NOR gates, each of which is connected to an inhibit line of a selected memory module 28 through 42 and to a fetch priority line each of which is indicative of whether a particular word in the selected cache block has been fetched. For instance, a NOR gate 160 is connected to a CTFCHPRI0P line 162 and a CTINHIB0P line 164. The line 162 is driven high when the highest priority word, word 00 in the cache block has been fetched. The line 164 is driven high when the highest priority memory module, in this instance, memory module 28 is inhibited.

Similarly, a NOR gate 166 has connected to it a 01 priority lead 168 and a 01 memory module lead 170 which is connected to the memory module 30. A NOR gate 172 has a 02 priority lead 174 and a 02 memory module lead 176 which is connected to the inhibit line of the memory module 32. A NOR gate 178 has a 03 priority line 180 which is indicative of a previous fetch of word 03 in the block and a 03 inhibit line 182 which is connected to the inhibit line of the memory module 34. In the event that word 00 has previously been fetched or the inhibit is on for the memory module 28, an output line 200 is driven low. Likewise, if there is a previous fetch for word 01 or the memory module 30 is inhibited an output line 202 is driven low. In the event that the word 02 has previously been fetched or the memory module 32 is inhibited an output line 204 is driven low. In the event that the word 03 has previously been fetched or the memory module 34 is inhibited, an output line 206 is driven low. Output lines 200 through 206 are connected to the respective binary input pins 0 through 3 of the multiplexer 150.

The NOR gate stack 152 includes a NOR gate 210 which receives the 04 fetch priority code on a line 212 and a 04 inhibit from the memory module 36 on a line 214. In the event that word 04 has been fetched or the memory module 36 is inhibited, a line 216 is driven low by the gate 210.

A fetch completion signal for 05 is fed on a line 220 to the gate 218. An inhibit signal 05 for the memory module 38 is fed on a line 222 to the gate 218. In the event that either word 05 or the memory module 38 inhibit signal is asserted an output line 224 is driven high.

A NOR gate 226 is connected to receive the word 06 fetch priority signal on a line 228 and the memory module 40 inhibit signal on a line 230 connected to the memory module 40. In the event that the memory module 40 is inhibited or the word 06 has previously been fetched, a line 232 is driven low.

Finally, a NOR gate 240 receives a word 07 fetch priority signal on a line 242 or a 07 memory inhibit signal on a line 244 from the memory module 42. In the event that the seventh word of the block has been fetched or the memory module 07 is inhibited an output line 246 is driven low.

The output lines 216, 224, 232 and 246 are respectively connected to binary input pins 4 through 7 of the multiplexer 150. The 3-bit word address received on lines 120 through 124 causes the multiplexer 150 to select an output from one of the OR gates in the OR gate stacks 152 and 154, thereby determining whether a particular word and memory module combination are available to respond to a fetch. The signal is output on an output line 250 connected to the memory module 150 which is connected to multiplexer 252 and a multiplexer 254. The multiplexer 252 is a 10H173 2-input multiplexer latch. The multiplexer 254 is a 10H164 emitter coupled logic 8 to 1 multiplexer. When the output line 250 is driven high, the multiplexer 252 is caused to select the signal from a CTADDR26P address line 260, a CTADDR27P address line 262 and a CTADDR28P address line 264 which receives the signals fed from the adder/subtracters 132 and 134 after the adding operation has been completed on the 3-bit signal supplied on the lines 120 through 124. Since in the present embodiment, a 0 is added to the 3-bit signal, the signal on the line 250 is driven high.

The multiplexer 252 selects the signals on lines 260 through 264 when the line 250 is driven high. In other words, the memory module for that address is not inhibited and the word having that address has not previously been fetched. The signals are then output on a plurality of lines 270, 272 and 274. In the event that the selected word/memory module pair indicates a previous fetch or an inhibit by driving line 250 low, the second inputs for the multiplexer 252 are selected on lines 280, 282 and 284. Those lines are connected to a 10H165 8 input binary encoder 290 which receives signals from each of the OR gates in the pluralities 152 and 154 and selects the highest order signal fed to it which is positive. In other words, it selects the highest order word and memory module pair for which a previous fetch signal is asserted and a memory inhibit signal is not asserted. That prioritized selection is then fed as an encoded binary signal on lines 280 through 284 to the multiplexer 252 and output on lines 270 through 274. The signal is also fed to the multiplexer 254 to the selection pins for a parity checking function. In addition, the word address to be fetched being output on the lines 270 through 274 is fed to a 10H162 binary decoder 300 which has eight binary output pins 0 through 7. One of which is asserted in response to the address being sent indicating which word and memory module are being selected on a fetch selection bus 302 consisting of leads 304, 306, 308, 310, 311, 312, 314 and 316.

Referring now to FIG. 3, the lines 270, 272 and 274 carrying the selected word address are connected to the register 100 for output on lines 102, 104 and 106 which are connected to the system bus 12.

Figure 7A:
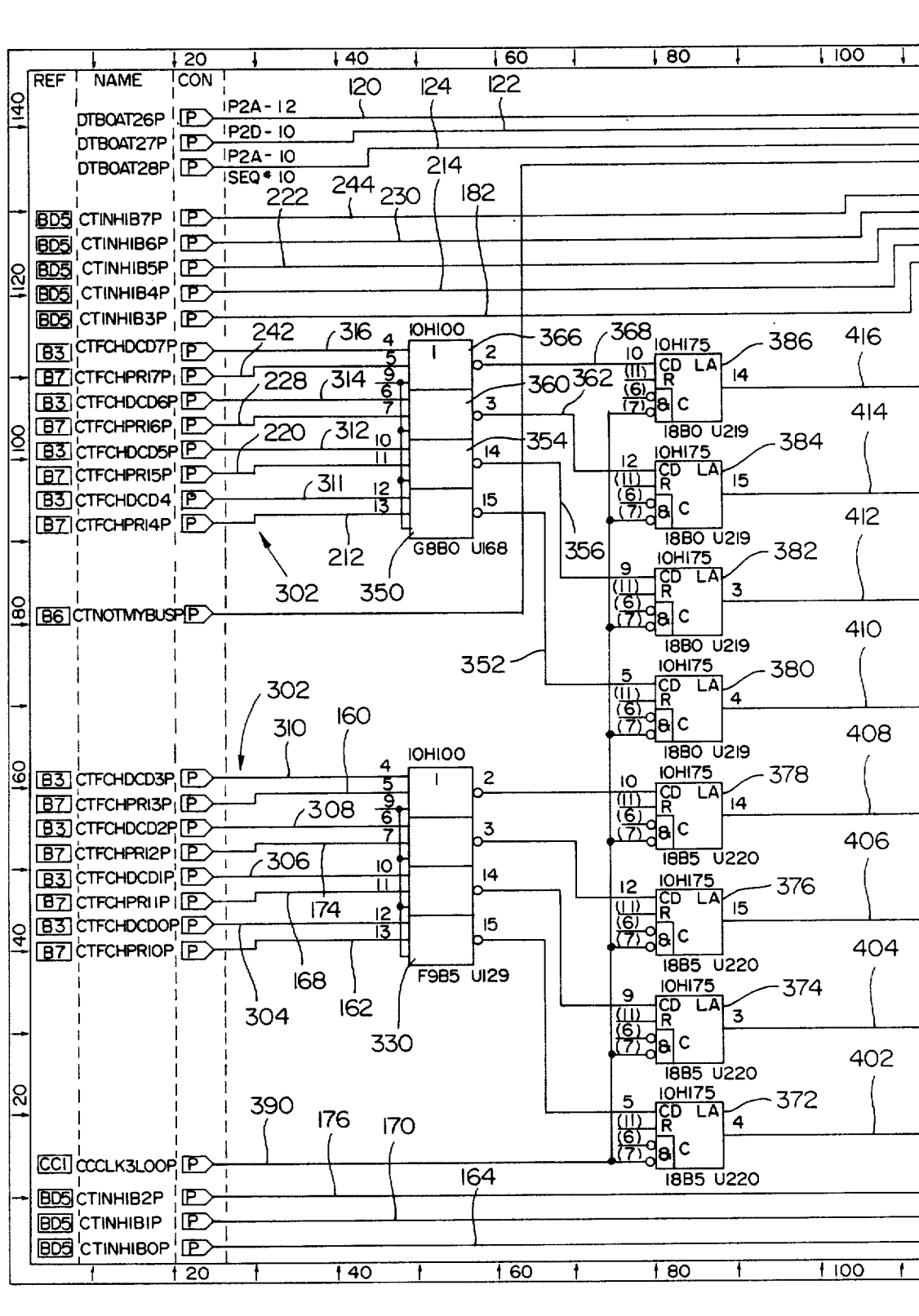
FIG. 7 is a logic diagram of a portion of the cache memory of FIG. 1.
Figure 7B:
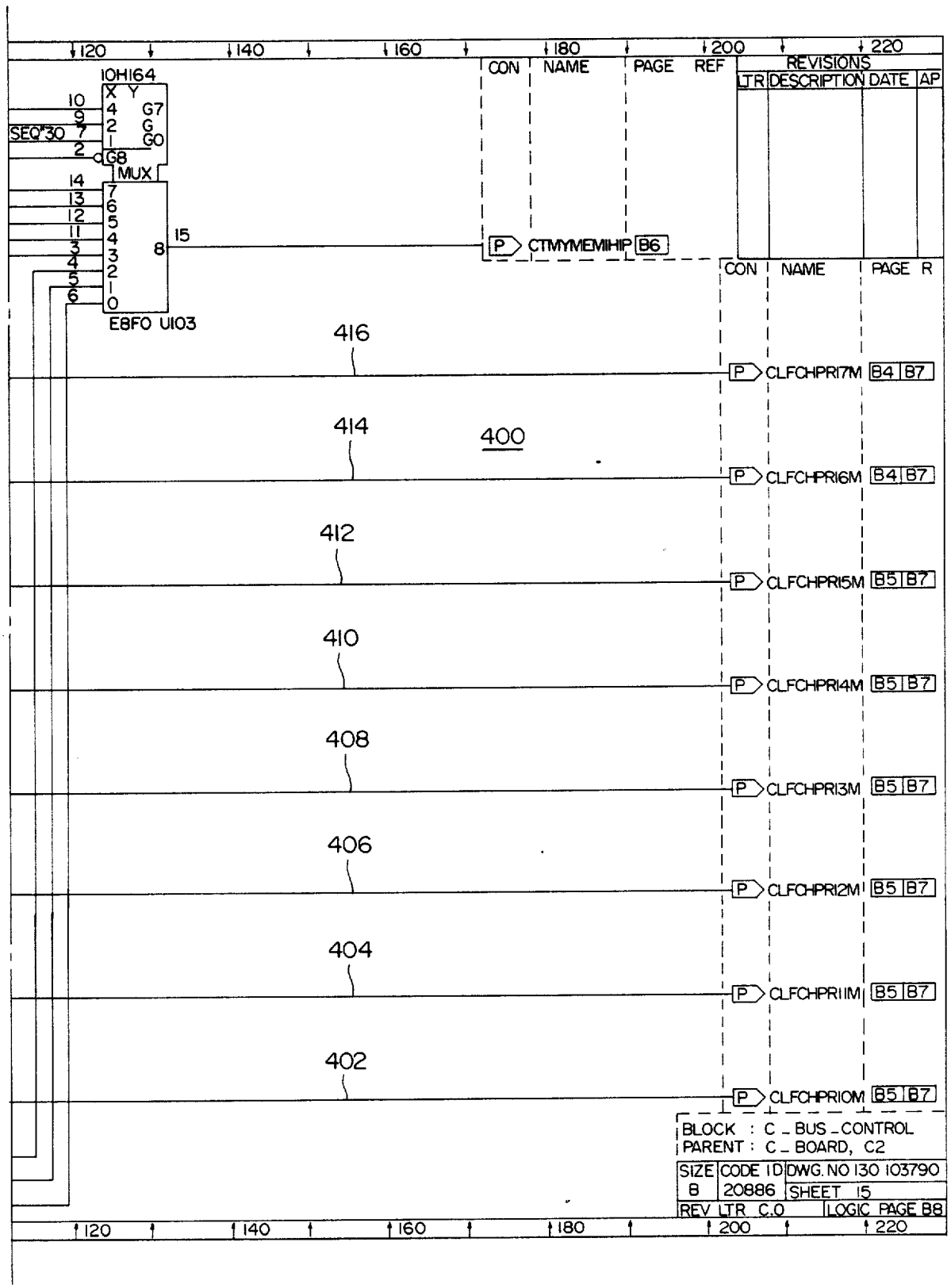

Referring now to FIG. 7, the fetch indicating bus 302 is shown thereon. A plurality of NOR gates, including a NOR gate 330 receives a word 0 previous fetch signal on the line 162 and a word 0 fetch signal on the line 304 and drives a line 332 low in the event that the word 0 has previously or is currently being fetched. Likewise, an OR gate 334 receives signals from leads 168 and 306 indicative of whether the word 01 is currently or has previously been fetched and if so outputs a signal on the line 336. A NOR gate 338 receives a word 02 previous fetch signal on line 174 or a current fetch word 02 signal on the line 308 and asserts a line 340 in the event that the word 02 is currently or is now being fetched. An OR gate 342 is connected to the lines 180 and 310 which are indicative of a previous fetch of word 03 or a current fetch of word 03 and drives an output line 344 low in the event that word 03 has previously or currently been fetched.

A NOR gate 350 is connected to the lines 212 and 311 which respectively are asserted when the word 04 has previously been fetched or is currently being fetched. The NOR gate 350 drives an output line 352 low when word 04 is being fetched.

A NOR gate 354 having an output line 356 receives signals on the lines 220 and 312 indicative of a previous or current fetch of word 05 and drives line 356 low when word 05 has already been fetched.

A NOR gate 360 having an output line 362 is connected to the lines 228 and 314 and drives line 362 low when either the word 06 has previously been fetched or is currently being fetched.

A NOR gate 366 having an output line 368 is connected to the lines 242 and 316 are driven high when the word 07 has previously been fetched or is currently being fetched and causes line 368 to be driven low in the event of such previous or current fetch of the word 07.

An 3-bit register 370 including a word 0 latch 372, a word 01 latch 374, a word 02 latch 376, a word 03 latch 378, a word 04 latch 380, a word 05 latch 382, a word 06 latch 384 and a word 07 latch 386 are connected respectively to lines 332, 336, 340, 344, 352, 356, 362 and 368 to receive the word fetch signals from those lines. The latch 370 is clocked from an input clock line 390 and drives a previous fetch bus 400 comprised of lines 402, 404, 406, 408, 410, 412, 414 and 416 which are respectively connected to the outputs of the latches 372, 374, 376, 378, 380, 382, 384 and 386.

The signals are then fed to a latching section as may best be seen in FIG. 7. The lead 402 feeds its signal to a NOR gate 420 which drives a latch 422 connected to the line 162. The line 404 carries a signal to drive a NOR gate 424 connected to a latch 426 which drives the line 168. A signal on the line 306 is connected to a NAND gate 430 which drives a latch 432 connected to the line 174. A NAND gate 436 is connected to the line 408 and drives a low order output of a latch 440 which is connected to the line 180. A NAND gate 450, a NAND gate 460, A NAND gate 470 and a NAND gate 480 are respectively connected to lines 410, 412, 414 and 416 and drive register ports of the register 440 which are connected to the output lines 212, 220, 228 and 242. Thereby causing the priority signals on lines 402 through 406 to effectively be latched on the output lines 162, 168, 174, 180, 212, 220, 228 and 242. A clear line 500 is connected to the gates 420, 424, 436, 450, 460, 470 and 480 so that when the line is driven high, all outputs from the gates are driven low causing the lines 162, 168, 174, 180, 212, 220, 228 and 242 to all be driven low feeding parallel zeros back into gates 420, 424, 436, 450, 460, 470 and 480 thereby indicating that the unit was configured to fetch the next block of eight words which the central processing unit needed.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A cache memory address modifier for dynamic alteration of a cache block fetch sequence from a main memory which includes a plurality of memory modules, comprising:

word address receiving means for receiving a first memory word address of a first desired word of a storage block comprising a plurality of words to be fetched from main memory, the first memory word address identifying a storage location in a particular memory module of said plurality of memory modules of said main memory from which the first desired word is to be fetched;

testing means coupled to said word address receiving means and to the main memory, for testing the particular memory module associated with the memory word address and for determining whether the particular memory module is free to process a data return in response to receipt of the first memory word address, or whether said particular memory module is inhibited and thereby issuing a memory inhibit signal; and dynamic address alteration means coupled to said testing means and responsive to said memory inhibit signal for generating a second memory word address of a second desired word of the storage block when the testing means indicates that the particular memory module is inhibited, the second memory word address identifying a second memory word of the storage block, said dynamic address alteration means further comprising means for selecting by priority a free memory module of said plurality of memory modules other than said particular memory module storing the second desired word which has not yet been fetched.

2. A cache memory address modifier for dynamic alteration of a cache block fetch sequence from main memory as defined in claim 1, wherein the means for selecting by priority includes a priority encoder.

3. A cache memory address modifier for dynamic alteration of a cache block fetch sequence from main memory as defined in claim 1, wherein the testing means includes a plurality of OR gates and wherein said dynamic address alteration means includes means for generating a fetch priority signal indicative of whether said first desired word has previously been fetched, each OR gate of said plurality being connected to receive said fetch priority signal and the memory inhibit signal indicative as to whether the particular memory module of the main memory is inhibited or is free.

4. A cache memory address modifier for dynamic alteration of a cache block fetch sequence from a main memory as defined in claim 3, wherein the dynamic address alteration means further includes a multiplexer controlled by an output of one of the OR gates so that when the particular memory module is free and the first desired word has not been fetched the word address of said first desired word is output to the main memory for subsequently attempting to retrieve said first desired word and said means for selecting by priority generates a signal indicative of the highest priority unfetched word of said storage block in said free memory module other than said particular memory module so that when the first desired word has been previously fetched or the particular memory module is inhibited, said signal is received from said means for selecting by priority to fetch the highest priority unfetched word residing in said free memory module.

5. A cache memory address modifier for dynamic alteration of a cache block fetch sequence from a main memory which includes a plurality of memory modules, comprising:

word address receiving means for receiving a first memory word address of a first desired word of a storage block comprising a plurality of words to be fetched from main memory, the first memory word address identifying a storage location in a particular memory module of said plurality of memory modules of said main memory from which the first desired word is to be fetched;

testing means coupled to said word address receiving means and to the main memory, for testing the particular memory module associated with the first memory word address and for determining whether the particular memory module is free to process a data return in response to receipt of the memory word address, or whether said particular memory module is inhibited and thereby issuing a memory inhibit signal;

dynamic address alteration means coupled to said testing means and responsive to said memory inhibit signal for generating a second memory word address of a second desired word of the storage block when the testing means indicates that the particular memory module is inhibited, the second memory word address identifying a second memory word of the storage block; and wherein the testing means includes a plurality of OR gates and wherein said dynamic address alteration means includes means for generating a fetch priority signal indicative of whether said first desired word has previously been fetched, each OR gate of said plurality being connected to receive said fetch priority signal and the memory inhibit signal indicative as to whether the particular memory module of the main memory is inhibited or is free.

6. A cache memory address modifier for dynamic alteration of a cache block fetch sequence from a main memory as defined in claim 5, wherein the dynamic address alteration means further includes a multiplexer controlled by an output of one of the OR gates so that when the particular memory module is free and the first desired word has not been fetched the word address of said first desired word is output to the main memory for subsequently attempting to retrieve said first desired word and means for selecting by priority for generating a signal indicating the highest priority unfetched word of said storage block in a free memory module other than said particular memory module so that when the first desired word has been previously fetched or the particular memory module is inhibited, said signal is received from said means for selecting by priority the highest priority unfetched word residing in said free memory module.

* * * * *